Patented Oct. 7, 1941

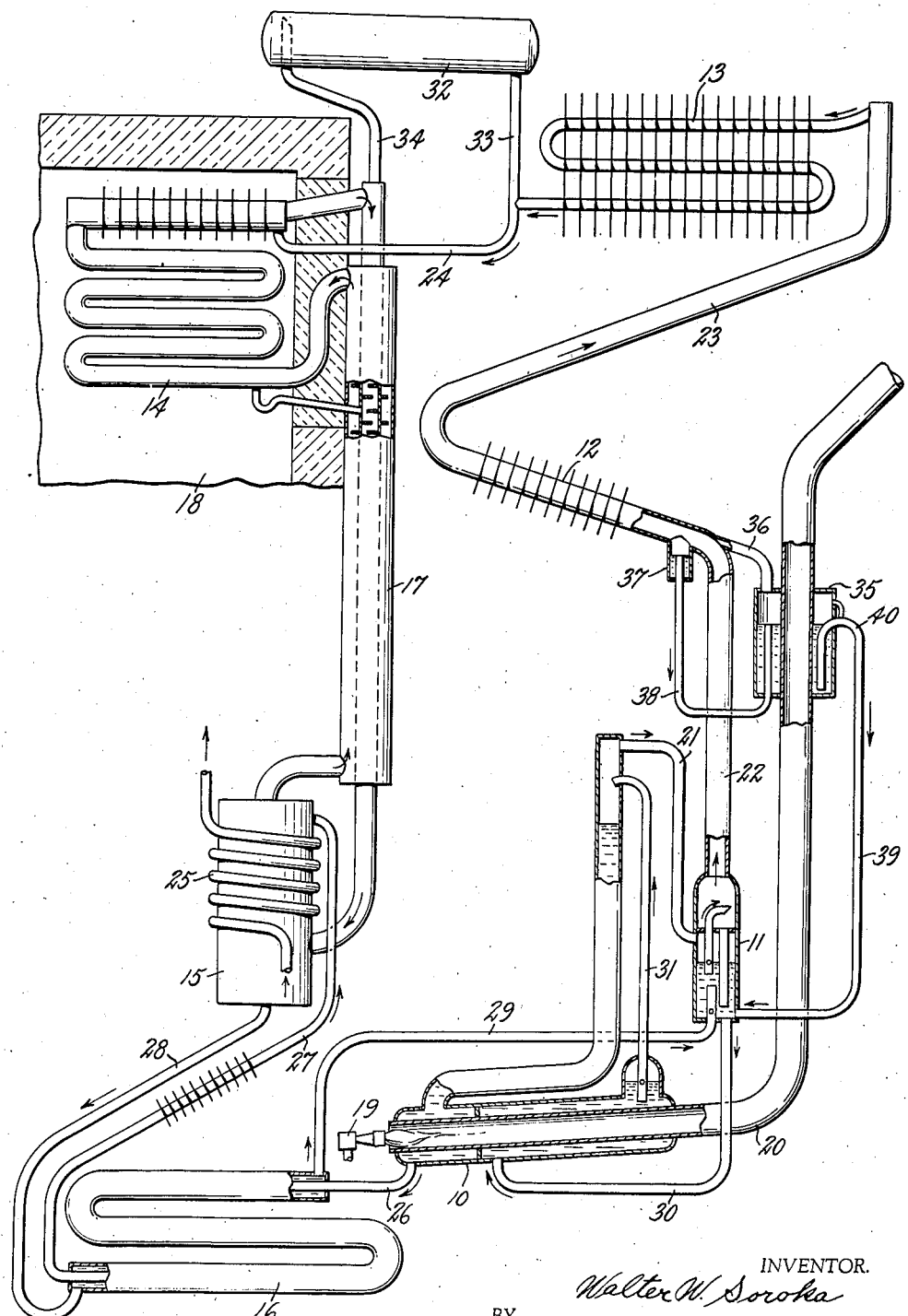

2,257,986

UNITED STATES PATENT OFFICE 2,257,986

REFRIGERATION

Walter W. Soroka, Evansville, Ind., assignor to Servel, Inc., New York, N. Y., a corporation of Delaware Application December 11, 1937, Serial No. 179,234

8 Claims. (Cl. 62—179)

My invention relates to refrigeration and more particularly to a refrigeration system making use of absorption and expulsion of refrigerant fluid with respect to an absorbent.

It is an object of the invention to provide a more efficient heat operated absorption refrigeration system.

The drawing shows more or less diagrammatically an absorption refrigeration system embodying the invention. This system is of a type which makes use of an auxiliary pressure equalizing medium and comprises a generator 10, an analyzer 11, a rectifier 12, a condenser 13, an evaporator 14, and an absorber 15. The generator 10 and absorber 15 are interconnected for circulation of liquid therethrough and therebetween by conduits including the analyzer 11 and a liquid heat exchanger 16. The absorber 15 and evaporator 14 are interconnected for circulation of gas therethrough and therebetween by conduits including a gas heat exchanger 17. The evaporator is located in an insulated refrigerator compartment 18. The condenser 13 is connected to receive vapor from the generator 10 and deliver liquid to the evaporator 14. Vapor flowing from the generator 10 to the condenser 13 passes through the analyzer 11 and rectifier 12. The rectifier 12 is shown provided with fins for cooling by air. The generator 10 is heated by a gas burner 19 which is arranged so that the burner flame projects into the lower end of a flue 20 which extends through the generator.

The system is hermetically sealed and contains a refrigerant fluid, such as ammonia, an absorption liquid, such as water, and an auxiliary pressure equalizing medium such as hydrogen. In operation, heat is applied by the burner 19 to the water solution of ammonia in generator 10, causing expulsion of ammonia vapor. The vapors flow from the upper part of the generator 10 through a conduit 21 into the analyzer 11. The vapors bubble through liquid in the analyzer 11 and then flow through a conduit 22, air cooled rectifier 12, and conduit 23 to the upper end of condenser 13. Ammonia vapor is condensed to liquid in the condenser 13 and the liquid flows from the lower end of the condenser through a conduit 24 to the upper part of evaporator 14. Liquid ammonia flows downward in evaporator 14 and evaporates and diffuses into hydrogen, producing a refrigerating effect.

Ammonia vapor is absorbed out of the hydrogen in absorber 15 by weakened absorption liquid. The absorber 15 is cooled by a coil 25 through which is circulated a heat transfer fluid such as water or a volatile fluid of a vaporization-condensation heat transfer circuit. The absorber may also be directly air cooled. Circulation of gas in the absorber-evaporator circuit is caused by difference in specific weights of the columns of rich and poor gas. Weakened absorption liquid flows from the generator 10 through a conduit 26, liquid heat exchanger 16, and conduit 27 to the upper part of the absorber. Enriched absorption liquid flows from the lower part of the absorber through a conduit 28, the liquid heat exchanger 16, a conduit 29, the analyzer 11, and a conduit 30 back to generator 10. Circulation of liquid is caused by raising liquid from the lower part of the generator to the upper part through a conduit 31 by known vapor-lift action.

One end of a vessel 32 is connected by a conduit 33 to the outlet end of condenser 13. The other end of the vessel 32 is connected by a conduit 34 to the gas circuit. Vessel 32 provides an accumulation space for hydrogen which is displaced into the gas circuit by ammonia vapor in a known manner at high room temperature conditions.

Vapor which is expelled by heat in the generator 10 is ammonia vapor and some water vapor. Heat carried by the water vapor represents a loss. This loss is reduced by recovery of some of the heat in the analyzer 11 in known manner. Water vapor is also condensed in the path of flow of vapor from the analyzer to the condenser 13, mostly in the rectifier 12. Ammonia vapor also may be condensed in rectifier 12 in greater or less quantities depending upon temperature conditions. Liquid formed by condensation in the rectifier would represent higher operating efficiency if it were all absorption liquid.

A certain amount of heat from the burner 19 is used because it is transferred to liquid in the generator 10. Some heat from the burner 19 is not used but is lost in the products of combustion which pass on upward through the flue 20. This is generally known as flue or stack loss. In accordance with this invention I utilize stack loss to reduce rectifier loss and thereby increase efficiency of the system. Reference in the claims to unused heat means heat which has not been transferred to fluid in the refrigeration system or process.

Around the upper end of flue 20 is a jacket 35. The upper part of jacket 35 is connected by a conduit 36 to the rectifier 12. At the lower end of rectifier 12 is a well or sump 37. One end of a U-shaped conduit 38 extends upward in the well 37 and the other end extends upward into the jacket 35. The lower part of the jacket 35 is connected by a conduit 39 to the analyzer 11 or other suitable part of the absorption liquid circuit.

Liquid formed by condensation in rectifier 12 flows downward and collects in well 37. Liquid overflows from well 37 into the U-shaped conduit 38. The end of conduit 38 in well 37 is higher than the end of conduit 38 in jacket 35 so that liquid flows from the well 37 through conduit 38 into the jacket 35. Conduit 39 is provided with an inverted U-shaped portion 40. Liquid flows from the lower part of jacket 35 through conduit 39 back to the liquid circuit. The height of the inverted U-shaped portion 40 of conduit 39 determines the overflow level of liquid in jacket 35.

Liquid in jacket 35 is heated by products of combustion in the flue 20. When the concentration of solution is at a certain value relative to the temperature in jacket 35, ammonia vapor is expelled from solution and flows from the jacket 35, through conduit 36 into the path of vapor toward the condenser 13. Liquid is admitted into the upper part of jacket 35 and withdrawn from the lower part thereof so that the concentration will be greatest at the surface of the liquid which is the place where the expelled vapor passes out of the liquid, wherefore the expelled vapor contains a maximum content of ammonia.

The upper part of U-bend 40 is vented into the upper part of jacket 35 to prevent siphoning of liquid. Conduit 36 is conveniently shown connected to the lower part of rectifier 12, but the actual place of this connection should preferably be at or near the place in rectifier 12 at which the water vapor content of the vapors is the same as the water vapor content of the vapors in conduit 36. This point may be found to be at the upper end of the rectifier. The purpose is to avoid the growth of entropy which would be occasioned by mixing vapors having different contents of water vapor.

Various changes and modifications may be made within the scope of the invention which is not limited except as indicated in the following claims.

What I claim is:

1. In an absorption refrigeration system having a main circuit including a condensation type rectifier, an auxiliary circuit including a vaporizer connected to receive condensate from said rectifier and deliver vapor to said main circuit, and a burner and flue for supplying heat to said main circuit, said flue being arranged to also heat said vaporizer in the auxiliary circuit.

2. In a method of refrigeration which includes expelling refrigerant vapor from absorption liquid by heating, and conducting the expelled vapor in a stream which is cooled to cause rectification by condensation of absorption fluid, that improvement which consists in separately heating the condensate to expel therefrom refrigerant vapor garnered thereby during said rectification, and conducting the separately expelled vapor to said stream at a place at which the absorption fluid vapor content of said stream is substantially the same as the absorption fluid vapor content of the separately expelled vapor.

3. A method of refrigerating which includes using hot fluid to heat a generator to expel refrigerant vapor from and thereby weaken an absorbent in said generator, conducting the expelled refrigerant vapor through a rectifier to cause removal therefrom of vaporous absorbent by condensation of the latter, and conducting said fluid which has been used to heat said generator into heat transfer relation with the condensed absorbent apart from said weakened absorbent to expel from the condensed absorbent refrigerant vapor garnered thereby in said rectifier.

4. A refrigeration system having an element in which refrigerant vapor is expelled from absorption liquid thereby weakening the latter, an element in which the expelled vapor is rectified to cause removal of absorption liquid vapor therefrom by condensation of the latter to liquid, another element which receives said condensate apart from said weakened absorption liquid and in which there is expelled from the condensate refrigerant fluid vapor garnered during said rectification, and means for supplying hot fluid to heat said first vapor expulsion element and for conducting to said second vapor expulsion element fluid which has been used to heat said first element.

5. A system as in claim 4 in which said means consists of a burner and a flue for conducting combustion gases from said burner to said first element and thence to said second expulsion element.

6. An absorption refrigeration system including a plurality of generators, a rectifier connected to receive vapor from said generators, means to conduct condensate from said rectifier to a first of said generators, all liquid conducting means connecting said generators being arranged to conduct liquid only from said first generator to a second of said generators, and means for supplying hot fluid to heat said second generator and for conducting in heat transfer relation with said first generator fluid that has been used to heat said second generator.

7. A system as in claim 6 in which said last means consists of a burner and a flue for conducting combustion gases from said burner first to said second generator and thence to said first generator.

8. In an absorption refrigeration system having a condensation type rectifier, means to receive and heat condensate from said rectifier to form vapor, and means to conduct vapor from said first means and deliver such vapor to said rectifier at a section of the latter in which the concentration of absorbent in the vapor is substantially the same as the concentration of absorbent in the delivered vapor.

WALTER W. SOROKA.